US009696066B1

(12) United States Patent
Green

(10) Patent No.: US 9,696,066 B1
(45) Date of Patent: Jul. 4, 2017

(54) BI-FUEL REFRIGERATION SYSTEM AND METHOD OF RETROFITTING

(71) Applicant: Jason E. Green, Davie, FL (US)

(72) Inventor: Jason E. Green, Davie, FL (US)

(*) Notice: Subject to any disclaimer, the term of this patent is extended or adjusted under 35 U.S.C. 154(b) by 452 days.

(21) Appl. No.: 13/746,037

(22) Filed: Jan. 21, 2013

(51) Int. Cl.
*F02D 19/06* (2006.01)
*F25B 27/00* (2006.01)
*F02D 41/00* (2006.01)

(52) U.S. Cl.
CPC .......... *F25B 27/00* (2013.01); *F02D 19/0642* (2013.01); *F02D 41/0025* (2013.01); *F02D 2041/001* (2013.01); *F25B 2327/00* (2013.01); *F25B 2327/001* (2013.01)

(58) Field of Classification Search
CPC ............... F02D 19/066; F02D 19/0615; F02D 19/0607; F02D 19/06; F02D 41/0025; F02D 19/0642; F02B 27/00
USPC ........... 701/103, 104; 123/304, 41.05, 41.12, 123/179.15, 339.24, 525
See application file for complete search history.

(56) References Cited

U.S. PATENT DOCUMENTS

| | | | |
|---|---|---|---|
| 2,058,309 A | 10/1936 | Haering | |
| 2,831,754 A | 4/1958 | Manka | |
| 3,671,025 A | 6/1972 | Elliott | |
| 3,675,901 A | 7/1972 | Rion | |
| 3,761,065 A | 9/1973 | Rich et al. | |
| 3,866,781 A | 2/1975 | Stedman et al. | |
| 3,872,473 A | 3/1975 | Melgaard et al. | |
| 4,006,852 A | 2/1977 | Pilsner et al. | |
| 4,078,629 A | 3/1978 | Kutay et al. | |
| 4,234,922 A | 11/1980 | Wilde et al. | |

(Continued)

FOREIGN PATENT DOCUMENTS

| | | | | |
|---|---|---|---|---|
| CA | 2741263 A1 | * | 3/2012 | ............... F02D 9/02 |
| CA | 2741263 | | 10/2014 | |

(Continued)

OTHER PUBLICATIONS

GFS Corp., 'First LNG Mining Truck in U.S.' [online press release]. Oct. 21, 2010. Retrieved from the internet on Oct. 25, 2012: http://www.d2ginc.com/PDF/First%20LNG%20Mining%20Truck%20in%20US%20Press%20Kit%20Oct%2021.pdf.

(Continued)

*Primary Examiner* — Stephen K Cronin
*Assistant Examiner* — Jacob Amick
(74) *Attorney, Agent, or Firm* — Malloy & Malloy, P.L.

(57) ABSTRACT

A bi-fuel refrigeration system and method of retrofitting a refrigeration system for the same. The system includes an engine in energy supplying relation to a refrigeration unit, said engine running off a constant predetermined amount of gaseous fuel and a variable amount of distillate fuel. An electronic control unit generates control signals to dictate the ratio of gaseous to distillate fuel is used by the engine. An actuator is structured to provide isochronous control of the system, and is accordingly disposed in flow adjusting relation to the distillate fuel intake to variably adjust the amount of distillate fuel injected into the engine. The method of retrofitting includes at least inserting a gaseous fuel supply and mixer into the air supply line, inserting an electronic control unit for isochronous control of the system, and inserting an actuator for isochronous control of the amount of distillate fuel used in the system.

16 Claims, 4 Drawing Sheets

(56) References Cited

U.S. PATENT DOCUMENTS

| | | | |
|---|---|---|---|
| 4,270,576 A | 6/1981 | Takeda et al. | |
| 4,288,086 A | 9/1981 | Oban et al. | |
| 4,335,697 A | 6/1982 | McLean | |
| 4,415,051 A | 11/1983 | Taylor | |
| 4,442,665 A | 4/1984 | Fick et al. | |
| 4,444,373 A | 4/1984 | Hayashi | |
| 4,489,699 A | 12/1984 | Poehlman | |
| 4,499,885 A | 2/1985 | Weissenbach | |
| 4,520,785 A * | 6/1985 | Batchelor | F02M 21/04 123/27 GE |
| 4,522,159 A | 6/1985 | Engel et al. | |
| 4,527,516 A | 7/1985 | Foster | |
| 4,535,728 A | 8/1985 | Batchelor | |
| 4,564,298 A | 1/1986 | Gritters et al. | |
| 4,597,364 A * | 7/1986 | Young | F02B 43/00 123/27 GE |
| 4,603,674 A | 8/1986 | Tanaka | |
| 4,606,322 A | 8/1986 | Reid et al. | |
| 4,616,937 A | 10/1986 | King | |
| 4,617,904 A | 10/1986 | Pagdin | |
| 4,633,909 A | 1/1987 | Louboutin et al. | |
| 4,641,625 A | 2/1987 | Smith | |
| 4,708,094 A | 11/1987 | Helmich et al. | |
| 4,753,535 A | 6/1988 | King | |
| 4,770,428 A | 9/1988 | Sugiyama | |
| 4,799,565 A | 1/1989 | Handa et al. | |
| 4,817,568 A * | 4/1989 | Bedford | F02D 19/0605 123/27 GE |
| 4,861,096 A | 8/1989 | Hastings | |
| 4,955,326 A | 9/1990 | Helmich | |
| 5,033,567 A | 7/1991 | Washburn et al. | |
| 5,050,550 A | 9/1991 | Gao | |
| 5,054,799 A | 10/1991 | Fingerle | |
| 5,081,969 A | 1/1992 | Long, III | |
| 5,092,305 A | 3/1992 | King | |
| 5,156,230 A | 10/1992 | Washburn | |
| 5,176,448 A | 1/1993 | King et al. | |
| 5,215,157 A | 6/1993 | Teich | |
| 5,224,457 A | 7/1993 | Arsenault et al. | |
| 5,355,854 A | 10/1994 | Aubee | |
| 5,356,213 A | 10/1994 | Arpentinier | |
| 5,370,097 A * | 12/1994 | Davis | F02D 19/0631 123/27 GE |
| 5,375,582 A | 12/1994 | Wimer | |
| 5,379,740 A | 1/1995 | Moore et al. | |
| 5,404,711 A | 4/1995 | Rajput | |
| 5,518,272 A | 5/1996 | Fukagawa | |
| 5,526,786 A | 6/1996 | Beck et al. | |
| 5,546,908 A | 8/1996 | Stokes | |
| 5,566,653 A | 10/1996 | Feuling | |
| 5,566,712 A | 10/1996 | White et al. | |
| 5,593,167 A | 1/1997 | Barnhardt et al. | |
| 5,598,825 A | 2/1997 | Neumann | |
| 5,609,037 A * | 3/1997 | Fischler | B60H 1/3229 62/239 |
| D384,341 S | 9/1997 | Hoffman et al. | |
| 5,701,928 A | 12/1997 | Aoki | |
| 5,735,253 A | 4/1998 | Perotto et al. | |
| 5,755,210 A | 5/1998 | Sato et al. | |
| 5,794,979 A | 8/1998 | Kasuga et al. | |
| 5,806,490 A | 9/1998 | Nogi et al. | |
| 5,810,309 A | 9/1998 | Augustine et al. | |
| 5,845,940 A | 12/1998 | Colburn | |
| 5,937,800 A | 8/1999 | Brown et al. | |
| 5,996,207 A | 12/1999 | Brown et al. | |
| 6,003,478 A | 12/1999 | Huber | |
| 6,027,241 A | 2/2000 | King | |
| 6,041,762 A | 3/2000 | Sirosh et al. | |
| 6,101,986 A | 8/2000 | Brown et al. | |
| 6,151,547 A | 11/2000 | Kumar et al. | |
| 6,168,229 B1 | 1/2001 | Kooi et al. | |
| 6,200,014 B1 | 3/2001 | Babenko | |
| 6,250,260 B1 | 6/2001 | Green | |
| 6,250,723 B1 | 6/2001 | Barberis et al. | |
| 6,276,823 B1 | 8/2001 | King | |
| 6,289,881 B1 | 9/2001 | Klopp | |
| D452,693 S | 1/2002 | Mitchell | |
| 6,422,735 B1 | 7/2002 | Lang | |
| 6,513,485 B2 | 2/2003 | Ogawa et al. | |
| 6,543,395 B2 | 4/2003 | Green | |
| 6,550,811 B1 | 4/2003 | Bennett | |
| 6,659,636 B1 | 12/2003 | Matula | |
| 6,676,163 B2 | 1/2004 | Joitescu et al. | |
| 6,718,952 B2 | 4/2004 | Finch | |
| 6,751,835 B2 | 6/2004 | Fenton | |
| 6,766,231 B2 | 7/2004 | Nakagawa et al. | |
| D496,940 S | 10/2004 | Fetterman | |
| 6,863,034 B2 | 3/2005 | Kern et al. | |
| 6,875,258 B2 | 4/2005 | Kuperus | |
| 6,938,928 B2 | 9/2005 | Pfohl et al. | |
| 7,019,826 B2 | 3/2006 | Vook et al. | |
| D525,550 S | 7/2006 | Egidio | |
| D549,721 S | 8/2007 | Ito et al. | |
| 7,270,209 B2 | 9/2007 | Suess | |
| D552,121 S | 10/2007 | Carl et al. | |
| D555,164 S | 11/2007 | Sergio | |
| 7,299,122 B2 | 11/2007 | Perkins | |
| 7,334,818 B2 | 2/2008 | Mascarenhas et al. | |
| 7,341,164 B2 | 3/2008 | Barquist et al. | |
| 7,410,152 B2 | 8/2008 | Yates | |
| 7,441,189 B2 | 10/2008 | Michaels | |
| 7,444,986 B2 | 11/2008 | Shute | |
| D600,701 S | 9/2009 | Kase | |
| 7,607,630 B2 | 10/2009 | Jung et al. | |
| 7,621,565 B2 | 11/2009 | Ross, Jr. et al. | |
| 7,775,311 B1 | 8/2010 | Hardy et al. | |
| 7,874,451 B2 | 1/2011 | Bel | |
| 7,976,067 B2 | 7/2011 | Naganuma et al. | |
| 7,979,522 B2 | 7/2011 | Lunsford | |
| 8,005,603 B2 | 8/2011 | Fisher et al. | |
| 8,125,346 B2 | 2/2012 | Ballard et al. | |
| 8,282,132 B2 | 10/2012 | Griesbaum | |
| D677,685 S | 3/2013 | Simmons et al. | |
| 8,408,600 B2 | 4/2013 | Kondo et al. | |
| D681,670 S | 5/2013 | Fletcher et al. | |
| D686,244 S | 7/2013 | Moriya et al. | |
| 8,498,799 B2 | 7/2013 | Matthews, Jr. et al. | |
| 8,534,403 B2 | 9/2013 | Pursifull | |
| D691,164 S | 10/2013 | Lim et al. | |
| 8,550,274 B2 | 10/2013 | Gerding | |
| 8,556,107 B2 | 10/2013 | McRobbie et al. | |
| 8,820,289 B2 | 9/2014 | Green | |
| 8,881,933 B2 | 11/2014 | Green | |
| 8,882,071 B2 | 11/2014 | Green | |
| D726,742 S | 4/2015 | Aoshima | |
| 9,004,744 B1 | 4/2015 | Kemp | |
| 9,031,763 B2 | 5/2015 | Green | |
| D733,176 S | 6/2015 | Lin | |
| D748,649 S | 2/2016 | Kovacevic et al. | |
| D749,617 S | 2/2016 | Noack et al. | |
| D750,114 S | 2/2016 | Kettner et al. | |
| D750,120 S | 2/2016 | Kovacevic et al. | |
| D755,202 S | 5/2016 | Seo | |
| D759,704 S | 6/2016 | Kettner et al. | |
| D760,275 S | 6/2016 | Zhang | |
| 9,394,841 B1 | 7/2016 | Green | |
| D766,942 S | 9/2016 | Napper et al. | |
| D768,160 S | 10/2016 | McRae et al. | |
| D768,161 S | 10/2016 | McRae et al. | |
| D768,661 S | 10/2016 | McRae et al. | |
| 2001/0037549 A1 | 11/2001 | Fenton | |
| 2002/0017088 A1 | 2/2002 | Dillon | |
| 2002/0029770 A1 | 3/2002 | Heffel et al. | |
| 2002/0030397 A1 | 3/2002 | Tamura et al. | |
| 2002/0078918 A1 | 6/2002 | Ancimer et al. | |
| 2003/0178422 A1 | 9/2003 | Kosuge et al. | |
| 2003/0187565 A1 | 10/2003 | Wong | |
| 2004/0011050 A1 | 1/2004 | Inoue | |
| 2004/0140412 A1 | 7/2004 | Hendzel et al. | |
| 2004/0148086 A1 | 7/2004 | Tafazoli et al. | |
| 2004/0158086 A1 | 8/2004 | White | |
| 2005/0121005 A1* | 6/2005 | Edwards | F02D 19/0631 123/525 |

(56) References Cited

U.S. PATENT DOCUMENTS

| | | |
|---|---|---|
| 2006/0032532 A1 | 2/2006 | Suess |
| 2006/0033322 A1 | 2/2006 | Suess |
| 2006/0158961 A1 | 7/2006 | Ruscheweyh et al. |
| 2006/0161315 A1 | 7/2006 | Lewis |
| 2006/0245296 A1 | 11/2006 | Nishioka et al. |
| 2007/0277530 A1 | 12/2007 | Dinu et al. |
| 2008/0023957 A1 | 1/2008 | Diehl |
| 2008/0042028 A1 | 2/2008 | Ross |
| 2008/0163627 A1 | 7/2008 | ELKady et al. |
| 2009/0000842 A1 | 1/2009 | Hwang et al. |
| 2009/0152043 A1 | 6/2009 | Lee |
| 2009/0320786 A1 | 12/2009 | Fisher |
| 2010/0045017 A1 | 2/2010 | Rea |
| 2010/0051567 A1 | 3/2010 | Ross |
| 2010/0078244 A1 | 4/2010 | Pursifull |
| 2010/0127002 A1 | 5/2010 | Bel |
| 2010/0263382 A1 | 10/2010 | Mancini et al. |
| 2011/0087988 A1 | 4/2011 | Ray et al. |
| 2011/0202256 A1 | 8/2011 | Sauve et al. |
| 2011/0209074 A1 | 8/2011 | Gill et al. |
| 2012/0001743 A1 | 1/2012 | Cotten et al. |
| 2012/0060800 A1* | 3/2012 | Green ............... F02D 9/02 123/510 |
| 2012/0067660 A1 | 3/2012 | Kashu et al. |
| 2012/0112533 A1 | 5/2012 | Yarmak et al. |
| 2012/0253641 A1 | 10/2012 | Warner et al. |
| 2012/0296552 A1 | 11/2012 | Matthews, Jr. et al. |
| 2012/0310456 A1* | 12/2012 | Mischler ......... F02D 41/0007 701/22 |
| 2012/0310509 A1 | 12/2012 | Pardo et al. |
| 2012/0325355 A1 | 12/2012 | Docheff |
| 2013/0068905 A1 | 3/2013 | Green |
| 2013/0069357 A1 | 3/2013 | Green |
| 2013/0074816 A1 | 3/2013 | Green |
| 2013/0092694 A1 | 4/2013 | Green |
| 2013/0112768 A1 | 5/2013 | Hagenbuch |
| 2013/0245864 A1 | 9/2013 | Frazier et al. |
| 2013/0284747 A1 | 10/2013 | Rund |
| 2013/0284748 A1 | 10/2013 | Sloan et al. |
| 2013/0336084 A1 | 12/2013 | Janz |
| 2014/0053800 A1 | 2/2014 | Steffen et al. |
| 2014/0053816 A1 | 2/2014 | Czapka et al. |
| 2014/0060946 A1 | 3/2014 | Willi |
| 2014/0196687 A1 | 7/2014 | Coldren et al. |
| 2015/0000643 A1 | 1/2015 | Green |
| 2015/0020770 A1 | 1/2015 | Green |
| 2015/0025774 A1 | 1/2015 | Green |
| 2015/0142491 A1 | 5/2015 | Webb |
| 2015/0199089 A1 | 7/2015 | Lee et al. |
| 2015/0277750 A1 | 10/2015 | Sakaguchi |
| 2015/0375666 A1 | 12/2015 | Woods |
| 2016/0131007 A1 | 5/2016 | Kauderer et al. |
| 2016/0162123 A1 | 6/2016 | Kurita et al. |
| 2016/0257196 A1 | 9/2016 | Green |

FOREIGN PATENT DOCUMENTS

| | | |
|---|---|---|
| WO | WO 02101214 | 12/2002 |
| WO | WO 2008/037175 A1 | 4/2008 |
| WO | WO 2012/036768 A1 | 3/2012 |
| WO | WO 2013/039708 A1 | 3/2013 |
| WO | WO 2013/048812 A1 | 4/2013 |
| WO | WO 2013/058988 A2 | 4/2013 |
| WO | WO 2014/197594 | 12/2014 |
| WO | WO 2016/057239 | 4/2016 |
| WO | WO 2016/065026 | 4/2016 |
| WO | WO 2016/065109 | 4/2016 |
| WO | WO 2016/112156 | 7/2016 |

OTHER PUBLICATIONS

Caterpillar 785C Mining Truck Spec Sheet, 2010.
Chubb, Peter. 'Roku 3 vs. Apple TV 3G'. product-reviews.net [online]. Sep. 2, 2013 [retieved Jun. 20, 2016]. Retrieved from the Internet: <URL: http://www.product-reviews.net/2013/09/02/roku-3-vs-apple-tv-3g/>.
'Testing Windows 8 apps using Visual Studio 2012'. Blogs.msdn.microsoft.com [online]. Aug. 20, 2012 [retrieved Jun. 20, 2016]. Retrieved from the Internet: <URL: http://blogs.msdn.microsoft.com/windowsappdev/2012/08/20/testing-windows-8-apps-using-visual-studio-2012/>.
'WPF How to create a lateral menu like this (Modern-UI)'. stackoverflow.com [online]. Apr. 2, 2014 [retrieved Jun. 20, 2016]. Retrieved from the Internet: <URL: http://stackoverflow.com/questions/22817624/wpf-how-to-create-a-lateral-menu-like-this-modern-ui>.
In-vehicle LPG Bottle with shield dated Oct. 30, 2007 [retrieved from internet on Nov. 25, 2015] https://commons.wikimedia.org/wiki/File:In-vehicle_LPG_bottle_012.JPG.

* cited by examiner

BI-FUEL REFRIGERATION SYSTEM AND METHOD OF RETROFITTING

BACKGROUND OF THE INVENTION

Field of the Invention

The present invention relates generally to engines, and more specifically to bi-fuel systems that operate using more than one fuel source. For instance, the present system uses both distillate fuel as well as gaseous fuel for engine operation. The present invention also relates generally to refrigerated storage containers.

Description of the Related Art

Engines have been used to generate electrical energy required to drive many large devices. Industrial engines, in particular, are frequently used for large scale operations but suffer from inefficiency due to the large output required. This inefficiency translates into high operational costs.

Recent efforts have been made to make more efficient engines, such as for vehicles including passenger cars and trucks. For instance, multi-fuel engines are available that are capable of running off of different types of fuel, such as gasoline or diesel and an alternate fuel source, such as hydrogen or natural gas. The fuels are stored in separate tanks, and the engine operates off of only one at a time, switching back and forth between fuel sources either manually or automatically. The alternative fuel is used as a fuel supplement rather than entirely replacing gasoline or diesel, and may assist in making such engines more efficient or more environmentally friendly. However, they are not often used.

Refrigerated storage containers, or "reefers" as they are commonly referred to in the industry, are used to both store and transport temperature-sensitive goods that may spoil, degrade, or reduce in usefulness at temperatures higher than ambient or room temperature. The degree of temperature reduction required to maintain or preserve these goods is dependent on the physical and/or chemical characteristics of the particular goods themselves, and may vary from one type to another, requiring as low as zero or sub-zero temperatures. Accordingly, reefer units must be able to accommodate various temperature targets.

It requires a great deal of energy to refrigerate a storage unit, depending on the size of the interior space and the target temperature. Accordingly, a refrigeration unit, often including a compressor or other similar structure to cool the air, is typically driven by an industrial diesel engine, generator, or other power source. These industrial machines, however, are not very cost or energy efficient and their use drives up operation cost. This is frequently exacerbated in the case of mobile reefer units, to which the cost of fuel for transportation must also be factored. It would therefore be beneficial to have a more efficient way to cool refrigerated storage containers, such as reefer units, be they stationary or mobile.

SUMMARY OF THE INVENTION

The present invention is directed to a bi-fuel system for generating cool air, and therefore refrigerating a space, such as a storage container. The bi-fuel refrigeration system of the present invention utilizes natural gas, either compressed or liquefied, propane, or other gaseous fuel source in addition to a distillate fuel such as diesel. These fuel sources are combusted in an engine, which provides electrical energy for a compressor of a refrigeration unit disposed in air-circulating relation to the interior of a storage unit, such that cool air generated by the compressor is sent into the storage unit to cool the interior of the unit and goods contained therein to a predetermined temperature. Using a bi-fuel engine to run the compressor, as in the present invention, achieves greater fuel efficiency than standard diesel engines, which translates into cost savings.

Accordingly, the present system includes an engine operatively connected to a refrigeration unit to supply energy thereto for running a compressor to cool air. A constant predetermined amount of gaseous fuel, such as natural gas, is provided to the engine for combustion, as well a variable amount of distillate fuel, such as diesel. The gaseous fuel amount is set to maximize its use, and the more expensive distillate fuel is used to supplement the gaseous fuel, and is adjusted to accommodate and correct for deviations in the system so as to reach the preset energy outputs, such as set through a thermostat associated with the refrigeration unit.

To control the ratio of fuels, which is constantly in flux, the system includes an electronic control unit structured to generate control signals and to transmit these signals to dictate the ratio of gaseous to distillate fuel used, i.e. to adjust the amount of distillate fuel up or down corresponding to the given need. This electronic control unit is disposed in intercepting relation between the thermostat and the engine in order to have access to the thermostat setting, and therefore, the predetermined set point for engine output.

The present system further utilizes an actuator for isochronous control of the bi-fuel engine, such that a more gradual or incremental change of distillate fuel to be sent to the engine for combustion is achieved. Accordingly, if the system registers the engine output as either exceeding or falling short of the pre-established set point for engine output, such as in terms of energy production, engine speed, or temperature achieved as a result thereof, or other pre-established settings, then the actuator adjusts the amount of distillate fuel reaching the combustion chamber of the engine accordingly to correct for this deviation, in response to the control signals sent by the electronic control unit.

Given that the present system is a bi-fuel system, in at least one embodiment it also includes a mixer structured to facilitate the combination of gaseous fuel, such as natural gas, and air upstream of the engine combustion chamber. The mixer is disposed upstream of the air cleaner, such that build-up, residue, or particulate clogging of the cleaner that may result from the filtering of contaminants from the gas/air mixture will not affect the efficiency of the bi-fuel system.

Moreover, the system includes at least one sensor having monitoring capabilities structured to obtain performance information about the various portions of the bi-fuel system, and to transmit this information to the electronic control unit for modification of the fuel ratio, if necessary.

In at least one embodiment, the system further includes a dual output in place of the usual single engine output. A first line of this dual output connects to the original computing device of the engine, as usual. A second line of the dual output connects with the electronic control unit, feeding information about engine output to the electronic control unit.

The present invention is also directed to a method of retrofitting a refrigeration system for operation as a bi-fuel system. This method includes identifying a refrigeration system to retrofit that has at least a thermostat, engine, and distillate fuel supply, such as diesel. Once identified, the method further includes disconnecting the air supply line upstream of the engine, inserting a gaseous fuel supply and mixer in this disconnected air supply line, and connecting the gaseous fuel supply and mixer to either end of the disconnected air supply line in fluid flow communication therewith. Accordingly, this retrofit allows gaseous fuel, such as natural gas, to enter the engine for combustion with the distillate fuel and air.

The method further includes disconnecting an original engine speed controller, providing an actuator structured to isochronously control the speed of the engine, and connecting the actuator in controlling relation to the distillate fuel intake of the engine. This retrofit replaces the original "all-or-nothing" on/off intake control for a gradual, incremental control of influx of distillate fuel into the engine.

The method also includes providing an electronic control unit to regulate the ratio of gaseous fuel and distillate fuel used by the engine, and connecting the electronic control unit in intercepting relation between the thermostat and engine, and further in controlling relation to the actuator. This retrofit permits for the monitoring of the system and adjustable control of the ratio of gaseous to distillate fuel used to maximize efficiency.

The present method of retrofitting includes retaining the original engine components to form a level of redundancy in the system. Accordingly, in at least one embodiment, the method also includes steps for reversing the retrofitting, reverting to the original engine components in case it is needed or desired. This can easily be accomplished in the field if necessary.

The present system and method offer a variety of advantages over known systems for cooling reefer units. For instance, the engine is converted to a bi-fuel system to be more cost effective and energy effective. The percentage of gaseous fuel used is maximized while keeping the exhaust gas temperature and electronically controlled transmission within acceptable normal limits. The engine is converted to an isochronous speed control to enable gradual changes to the engine speed. This also allows for more efficient and cost effective cooling. For instance, using the present system the diesel fuel consumption in a high speed mode is reduced from 1.62 gallons per hour (GPH) to 0.25 GPH, using 84% gas substitution. At low speed, diesel consumption is reduced from 0.95 GPH to 0.22 GPH, using 77% gas substitution. These results translate directly into cost savings, which can be over $11,000 in savings per trailer or reefer unit.

Moreover, the retrofitting to the engine of the present method, so as to achieve the system of the present invention, is minimal, maintaining an OEM-like design and execution. Redundancy is also maintained, to keep the existing engine controls as a back-up in case reversion is needed.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The present invention is directed to a bi-fuel refrigeration system and a method of retrofitting a distillate engine to a bi-fuel system. In general, the present invention is directed to a refrigeration system used to cool the interior of storage container, such as mobile storage containers commonly referred to as "reefers." Typically, compressors of refrigeration units used to cool reefers operate by electricity supplied by a diesel engine. The present system improves on known technology by providing a more cost effective and efficient energy production for the operation of the compressor of the refrigeration unit. Specifically, the present invention provides a bi-fuel system in which an engine operates off two distinct fuel types, in this case a distillate fuel such as diesel, as well as a gaseous fuel such as natural gas. Primary use of a less expensive gaseous fuel, combined with an appropriate ratio complement of the more expensive and traditional distillate fuel for combustion produces the same amount of energy for significantly less operating cost. Accordingly, the cost to cool temperature-sensitive items during storage and transport is significantly lessened, and these savings can be transferred to other operating costs or allocated to profits.

Figure 1:
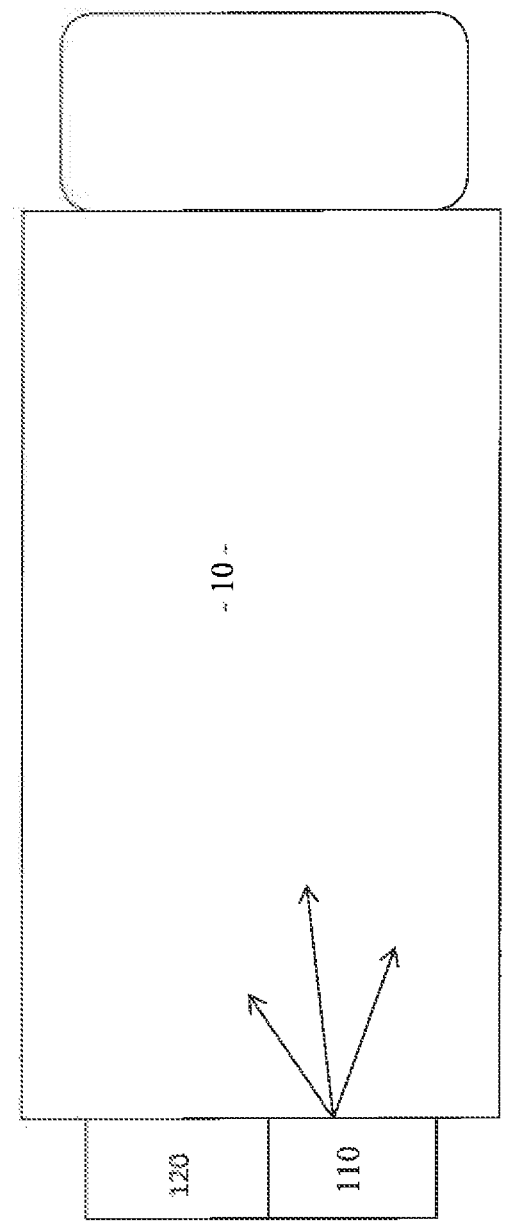
FIG. 1 is an illustration of the system of the present invention.
Figure 2:
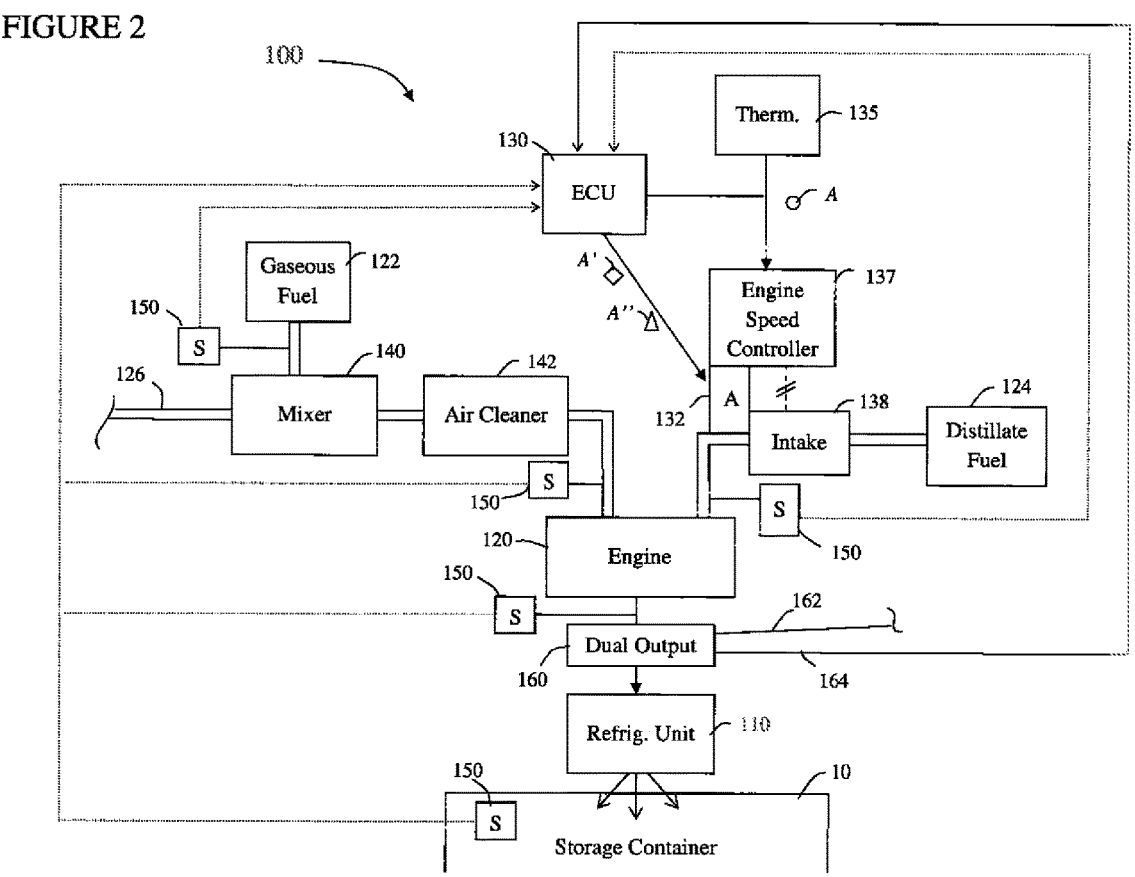
FIG. 2 is a schematic diagram of the system of the present invention.

More in particular, the present invention is directed to a bi-fuel refrigeration system, shown in FIGS. 1 and 2. For instance, FIG. 1 shows a general diagram of a "reefer" or cooled storage container 10, which is mobile by virtue of its connection to a trailer of a truck for transport. This view is from overhead or a top view of the truck and storage container 10, for illustrative purposes only. The bi-fuel system 100 is attached to the storage container 10, in proximity for providing cool air, indicated by the arrows of FIG. 1. The bi-fuel system 100 includes a refrigeration unit 110 having a compressor or other structure capable of generating cool air or of cooling air, and disposed in cooling relation to the interior of the storage container 10. The bi-fuel system 100 further includes an engine 120 and other accompanying components, to be described in greater detail hereinafter, structured to generate the operational energy for the refrigeration unit 110.

FIG. 2 shows a diagrammatic representation of more detail of the bi-fuel system 100 of the present invention. The bi-fuel system 100 includes an engine 120 operatively connected in energy supplying relation a refrigeration unit 110. As noted previously, the engine 120 generates the power used to operate the refrigeration unit 110. Accordingly, the energy produced by the engine 120 is communicated to the cooling component of the refrigeration unit 110, such as a compressor, in order that cool air is generated and provided to the storage container 10.

The engine 120 is preferably an internal combustion engine as is commonly understood, and is structured to use, combust, and/or burn two different types fuel sources, such as distillate fuel and gaseous fuel. More in particular, the engine 120 may be a diesel engine that has been retrofitted by the method 200 as described in greater detail hereinafter. Accordingly, in at least one embodiment the distillate fuel is diesel, although other embodiments contemplate gasoline, octane, ethanol, or other liquid fuels, or combinations thereof, as the distillate fuel. The gaseous fuel used may be any fuel in gas form. For instance, in at least one embodiment the gaseous fuel is natural gas, which may be compressed natural gas (CNG) or liquefied natural gas (LNG). In other embodiments, the gaseous fuel is propane or hydrogen.

The system 100 is structured to provide a ratio of gaseous and distillate fuels for combustion and corresponding energy production. Given the price differential between distillate fuel such as diesel, and gaseous fuels such as natural gas or propane, the system 100 is structured to maximize the amount of lesser-expensive gaseous fuel and minimize the amount of the more expensive distillate fuel used.

The system 100 is structured to achieve a predefined engine output using the most efficient ratio of gaseous to distillate fuel possible. Engine output may be defined as engine speed measured in revolutions per minute (rpm) or other similarly appropriate measurement, engine power such as measured in horsepower, energy produced measured in kilowatt hours (kWh) or Joules or other appropriate measurement, fuel consumption measured in gallons per hour (gph) or other similarly appropriate measurements, and even temperature of the air cooled as a result of the engine operation. In many embodiments, the desired temperature is set, such as via a thermostat, which dictates the engine output required to achieve such set temperature. Of course, any engine output may be preset or predefined, including but not limited to the above examples. As previously noted, the system 100 uses a ratio of gaseous to distillate fuel to achieve a predefined engine output. To this end, the system 100 includes a constant predetermined amount of gaseous fuel 122 set to the highest amount needed for a given desired engine output, or feasible in view of the energy production potential of the particular gaseous fuel in relation to the selected engine output. The balance of any additional fuel needed to reach the predefined engine output is achieved by a variable amount of distillate fuel 124.

The gaseous fuel 122 is disposed in fluid flow communication with the engine 120, such as the combustion chamber. Specifically, the gaseous fuel 122 is disposed to feed into the air supply line 126 of the engine. As is common with internal combustion engines, air is required for the combustion of fuel to occur, supplying the needed oxygen for ignition. In the present system 100, the gaseous fuel 122 is disposed in fluid flow communication with the air supply line 126 at a point upstream of the combustion chamber of the engine 120.

In at least one embodiment, the system 100 includes a mixer 140 structured and disposed to facilitate the combination and co-mingling of the gaseous fuel and air. The mixer 140 is likewise positioned upstream of the engine's combustion chamber such that the air and gaseous fuel 122 are well mixed upon entering the combustion chamber. Moreover, in at least one embodiment the system 100 further includes an air cleaner 142 structured to remove particulate contaminants from the air and gaseous fuel 124 mixture.

Most combustion engines have air cleaners or filters to remove particulates from the air before it enters the engine or combustion chamber, to prevent the engine compartments from becoming clogged and to provide as clean a burn as possible. The present system 100 also includes an air cleaner 142, which is disposed between the mixer 140 and the engine's combustion chamber. Accordingly, as the air cleaner 142 becomes dirty or clogged with debris, permitting less air and gas through, the fuel ratio for the system 100 may be easily adjusted to accommodate and correct for this change by increasing the amount of distillate fuel provided in compensation. In this manner, the system 100 remains efficient despite accumulated dirt, and can be used longer before the air cleaner 142 needs to be replaced.

Such efficiency would not be possible if the air cleaner 142 were placed upstream of the mixer 140. In such a placement, the air would be cleaned or filtered before being mixed with the gaseous fuel. As the air cleaner becomes dirty and clogged, less air would get through and be available to mix with the gaseous fuel, thus affecting the overall mix. The end result would be a decrease in ignition efficiency, and therefore combustion and engine output.

In contrast with the constant amount of gaseous fuel 122, the system 100 also includes a variable amount of distillate fuel 124, which in at least a preferred embodiment is diesel, disposed in controlled flow communication with the engine 120, such as the combustion chamber. More particularly, the amount of distillate fuel 124 is determined by the difference between the amount of gaseous fuel 122 providing a certain fixed amount of energy and the total energy needed as dictated by the preset engine output discussed previously. As the engine efficiency changes, which may be due to any of a number of factors, including but not limited to the air cleaner 142 becoming clogged, the ratio of gaseous to distillate fuel is adjusted by varying the amount of distillate fuel 124 used.

The amount of distillate fuel 124 permitted into the combustion chamber at any given time is controlled in concert by an electronic control unit 130 and actuator 132. Specifically, the electronic control unit 130 is a form of computing and/or regulating device, and is structured to generate at least one control signal which is configured to dictate a ratio of gaseous to distillate fuel provided to the engine.

In a typical reefer refrigeration system, a thermostat is used to set the desired temperature and monitor the actual temperature of the container. Commands are therefore sent from the thermostat to an engine speed controller, such as a rack puller, providing instructions to increase or decrease engine output in order to achieve the desired outcome, possibly through an original equipment manufacturer (OEM) computer or computing device to regulate the system. The engine speed controller or rack puller is in mechanical communication with a solenoid that changes a throttle position between one of two discrete positions, a first indicating low engine speed, and a second indicating high engine speed. The solenoid is therefore correspondingly in mechanical communication with the fuel injector, such that the distillate fuel either enters the engine or is prevented from entering the engine, depending on the throttle position of the solenoid.

As depicted schematically in FIG. 2, the electronic control unit 130 (ECU) of the present inventive system 100 is disposed between a thermostat 135 and the original engine speed controller 137, such as an OEM rack puller. The ECU 130 is therefore also disposed in intercepting relation to output command signals or messages A sent from the thermostat 137 to the engine speed controller 137, such as but not limited to the preset temperature and/or commands to increase or decrease engine output based on the set temperature and the actual temperature as detected, and transmits modified control signal(s) A' based thereon which is configured to dictate a ratio of gaseous to distillate fuel provided to the engine 120.

The current system 100 is further modified to remove the original solenoid, thus breaking the connection between the engine speed controller 137 and the intake 138 or fuel injector of the engine. Rather than a solenoid, the present system 100 has an actuator 132 disposed in mechanical communication with the engine speed controller 137 and the intake 138 or fuel injector. This actuator 132 is structured to permit isochronous, or gradual, control of the amount of distillate fuel 124 entering the engine at a given time. Therefore, rather than simply either allowing fuel to enter or not enter the engine in an "all or nothing" type manner as typical solenoids permit, the actuator 132 of the present system 100 allows for adjustment of engine speed on a gradual or incremental level, allowing some distillate fuel through the intake 138 which can be variable on a continuum between all or nothing.

Accordingly, the actuator 132 is structured and disposed to receive at least one control signal A' from the ECU 130, and is further disposed in flow adjusting relation of distillate fuel 124 into the engine 120 in response to these control signal(s) A'. Based on these control signals A', the actuator 132 moves to allow slightly more or less distillate fuel 124 from the intake 138 into the engine 120 for combustion, and can effect a gradual, incremental (isochronous) change in distillate fuel usage. Since these control signals A' are based on information intercepted from the thermostat 135, they are useful in regulating the temperature of the storage container 10.

Moreover, the ECU 130 is structured to send a plurality of control signals A' over time, such as at various predetermined time points or time intervals such as in terms of seconds or minutes, or may be sent whenever changes are registered by the thermostat 135. Accordingly, the amount of distillate fuel 124 being used in the engine 120 is constantly and/or consistently being tweaked or adjusted for maximum engine efficiency.

In addition, the system 100 includes at least one sensor 150 having monitoring capabilities structured to obtain performance information of the bi-fuel system 100 and to transmit this performance information to the ECU 130. For instance, sensors 150 may be disposed at various locations within the system to monitor various measures of performance, including but not limited to gaseous fuel use and efficiency, distillate fuel use and efficiency, engine power, engine speed, engine efficiency, and temperature. Moreover, each sensor 150 may have capabilities of monitoring one performance measurement, or any number of performance measurements.

By way of example, a sensor 150 may be positioned in monitoring relation to the air supply 126 to monitor the amount and efficiency of gaseous fuel 122 usage. Sensors 150 may be positioned at various locations along the air supply, such as downstream of the entry point of gaseous fuel 122 into the supply line (to measure gaseous fuel 122 input), downstream of the mixer 140 (to measure mixing efficiency), downstream of the air cleaner 142 (to measure cleaning efficiency), and just prior to gaseous fuel 122 entry into the engine 120 (to measure actual gaseous fuel 122 usage). Similarly, sensors 150 may be positioned just upstream of the intake 138 (to measure distillate fuel 124 input), and downstream of the intake 138 (to measure actual amounts of distillate fuel 124 being injected into the engine). Additional sensors 150 may be positioned in connection with engine to measure various engine outputs, such as engine power, speed, and efficiency. Sensors 150 may also be located within the interior of the storage container 10 to monitor the actual temperature thereof.

All these sensors 150 transmit the various performance information they monitor back to the ECU 130, which in turn generates and transmits at least one modified control signal A" based on this performance information to adjust the variable amount of distillate fuel 124 provided to the engine. Accordingly, the ECU 130 includes receiving capabilities to interpret the performance information as transmitted by the sensor(s) 150.

In at least one embodiment the sensors 150 are programmed to monitor for performance measurements and/or report corresponding information to the ECU 130 at various predetermined time points or intervals such as in terms of milliseconds, seconds, minutes, or hours. In other embodiments the sensors 150 may be programmed to constantly and continuously monitor for performance measurements and only report such information to the ECU 130 at certain time points or intervals. Alternatively, the sensors 150 may be programmed to monitor, record, and/or report performance measurements only when changes exceeding a certain specified range are detected. Of course, in some embodiments the sensors 150 may be programmed to monitor, record, and/or report performance measurements when prompted by a user. Moreover, each sensor 150 may monitor and/or report performance information per the same settings or different settings as the other sensors 150, and any combination thereof.

The system 100 further departs from a traditional refrigeration unit in that it includes a dual output 160 leading from the engine 120, rather than single output that most engines have. Specifically, the dual output 160 of the present system 100 includes a first line 162 disposed in communicating relation with an original OEM computing device of the engine 120. This first line 162 is essentially the same as the single output of an OEM engine in connectivity and function, being structured to provide engine output information to the existing engine computing device. However, the dual output 160 also includes a second line 164 disposed in communicating relation to the ECU 130. This second line 164 provides the same engine output information to the ECU 130 that the existing OEM computing device receives, so that the ECU 130 may direct adjustments to the variable amount of distillate fuel 124 being supplied to the engine 120 based on this information.

Figure 3:
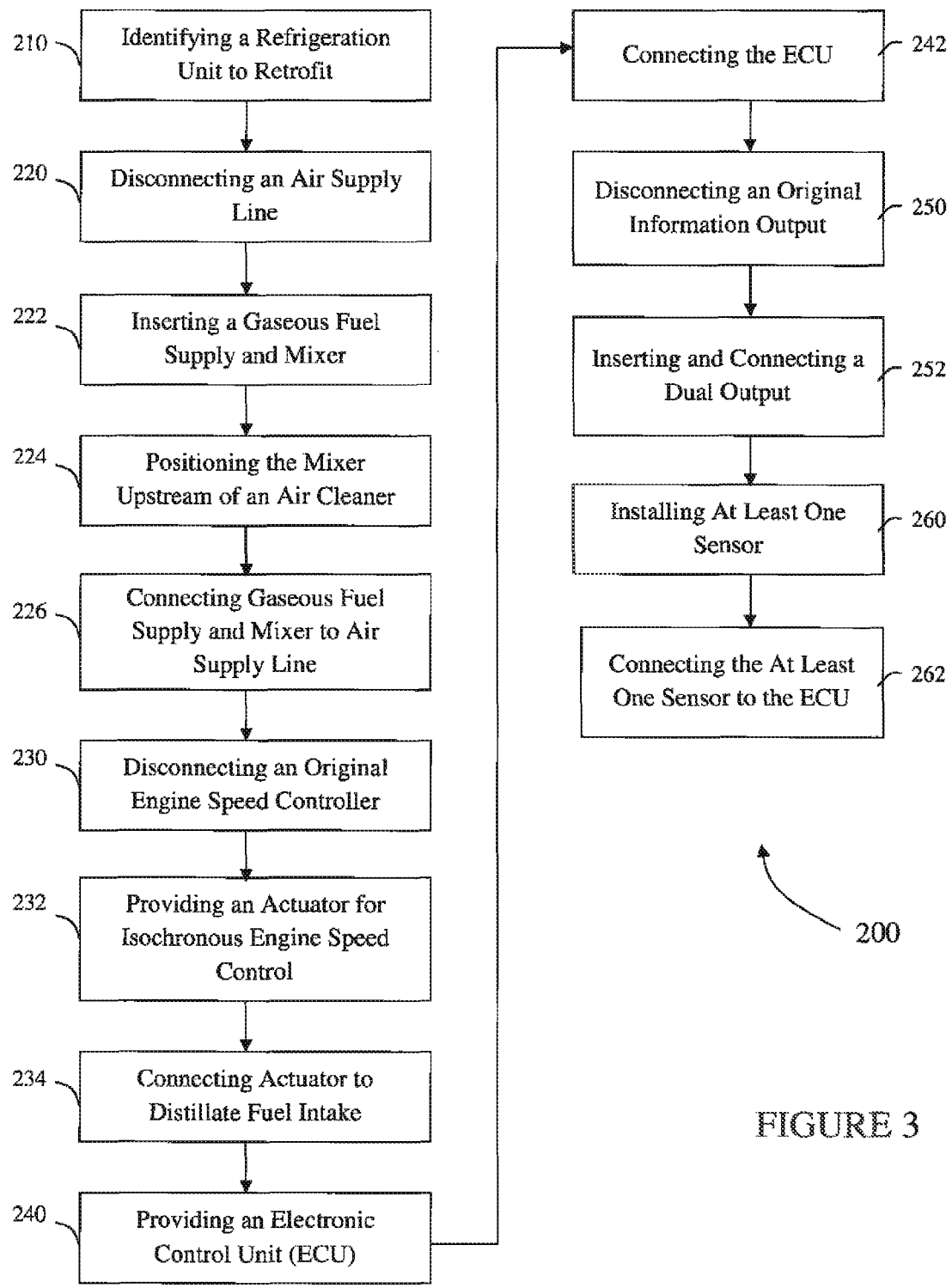
FIG. 3 is a schematic diagram of the method of the present invention.

The present invention is also directed to a method for retrofitting a refrigeration system for operation as a bi-fuel system, referenced hereinafter as 200 and as depicted schematically in FIGS. 3 and 4. Specifically, the method 200 includes identifying a refrigeration system to retrofit, as at 210. One example is a refrigeration or cooling unit, such as having a compressor, running off a diesel engine. In at least one embodiment, the refrigeration system to be retrofit by the instant method 200 includes at least a thermostat, an engine, and a distillate fuel supply, such as but not limited to diesel.

The retrofitting method 200 further includes disconnecting the air supply line upstream of the engine, as at 220. This creates a break in the air supply line to permit inserting a gaseous fuel supply and mixer upstream of the engine, as at 222. In at least one embodiment, the method also includes positioning the mixer upstream of the air cleaner, as at 224, to provide a more efficient mixing of gaseous fuel and air as previously described. Connecting the gaseous fuel supply and mixer to either end of the disconnected air supply line, as at 226, completes this portion of the retrofitting method 200 so as to introduce a second fuel type into the refrigeration system, and specifically, in fluid flow communication with the air supply line and engine. Accordingly, now both distillate fuel and gaseous fuel will enter the engine and be used to power the system 100.

The retrofitting method 200 further includes disconnecting an original engine speed controller, as at 230. Such OEM engine speed controller may be a rack puller and/or the solenoid contained therein. The method 200 then includes providing an actuator, as at 232, which is structured to isochronously control the engine speed, and connecting the actuator in controlling relation to the distillate fuel intake of the engine, as at 234. By these steps, the OEM solenoid is no longer in connection with the intake, and is replaced by the actuator as described previously, which enables isochronous (or gradual, incremental, or variable) control over the amount of distillate fuel that is injected into the engine for use.

The retrofitting method 200 also includes providing an electronic control unit (ECU), as at 240, to regulate at least the ratio of gaseous fuel and distillate fuel sent to and/or used by the engine, as previously described. The ECU is connected in intercepting relation between the thermostat and engine of the refrigeration system being retrofitted, as at 242, and further in controlling relation to the actuator. This is also described in greater detail above.

In at least one embodiment, the method 200 further includes disconnecting an original information output, as at 250, and inserting a dual output in place of the original information output, as at 252. This dual output is as previously described. Moreover, a first line is connected to the original engine speed controller, as at 254, and a second line is connected to the ECU, as at 256.

The method 200 further includes installing at least one sensor in monitoring relation to the refrigeration system, as at 260. As previously described in detail, the sensor(s) monitor various performance information of the engine and system, including but not limited to distillate fuel injected, distillate fuel consumption, gaseous fuel flow, gaseous fuel consumption, engine speed, power generated, and temperature. The method 200 therefore also includes connecting the at least one sensor in transmitting communication with the ECU, as at 262, for reporting such performance information back to the ECU.

The retrofitting method 200 of the present invention is minimally intrusive and does not require a massive overhaul of the refrigeration system. It therefore is easy to perform. Also, the original components are not removed, but rather are simply disconnected. As a result, and one benefit of the current method 200, is that the original components are retained even though they are not used. Reversion to these original components is therefore possible if needed, such as in the field if a particular component breaks or is rendered unusable. This gives a greater degree of flexibility in use.

Figure 4:
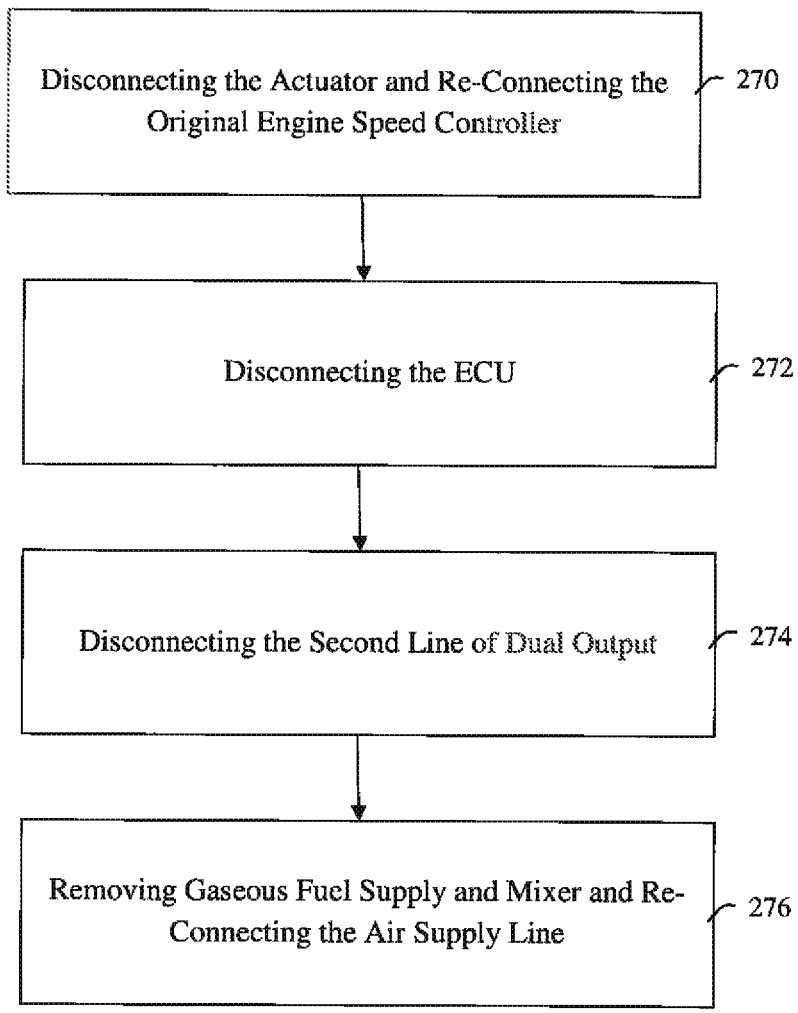
FIG. 4 is a schematic diagram of a portion of the method of the present invention.

For instance, in situations where reversion is needed or desired, the method 200 includes disconnecting the actuator and re-connecting the original solenoid and engine speed controller, as at 270, shown in FIG. 4. This reverts to the non-isochronous control of the original engine in which distillate fuel is provided in discrete "all-or-nothing" steps. Similarly, when isochronous control is no longer required or useful, such as when the actuator is replaced, the method 200 may also include disconnecting the ECU, as at 272, to revert to control of the engine by the original computing device. The method 200 may therefore further include disconnecting a second line of the dual output, as at 274, when the ECU is disconnected since the second output line would no longer be needed in such a case. Further, in some embodiments the method 200 may also include removing the gaseous fuel supply and mixer, as at 276, and reconnecting the air supply line to revert to a solely distillate fuel operation.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A bi-fuel refrigeration system, comprising:
    an engine operatively connected in energy supplying relation to a refrigeration unit; said refrigerator unit including a thermostat,
    a predetermined amount of gaseous fuel disposed in flow communication into said engine,
    a variable amount of distillate fuel disposed in controlled flow communication into said engine,
    an electronic control unit disposed in intercepting relation between said thermostat and said engine and structured to intercept an output command signal sent by said thermostat;
    said electronic control unit further structured to generate and transmit at least one control signal;
    said at least one control signal at least partially dependent upon said output command signal and configured to dictate a ratio of said gaseous fuel and distillate fuel provided to said engine
    and
    an actuator structured to receive said at least one control signal from said electronic control unit and further structured and disposed in flow adjusting relation of said distillate fuel into said engine in response to said at least one control signal.

2. The system as recited in claim 1 wherein said actuator is structured to isochronously adjust said amount of distillate fuel provided to said engine.

3. The system as recited in claim 1 wherein said gaseous fuel comprises at least one of compressed natural gas, liquid natural gas, propane, and hydrogen.

4. The system as recited in claim 1 further comprising a mixer structured and disposed to facilitate a combination of said gaseous fuel and air upstream of said engine.

5. The system as recited in claim 4 further comprising an air cleaner structured to remove particulate contaminants from the air and said gaseous fuel, and disposed downstream of said mixer and between said mixer and said engine.

6. The system as recited in claim 1 wherein refrigeration unit said is disposable in cooling relation to an interior of a storage container.

7. The system as recited in claim 6 wherein said storage container is mobile.

8. The system as recited in claim 1 further comprising at least one sensor having monitoring capabilities structured to obtain performance information about said bi-fuel refrigeration system and to transmit said performance information to said electronic control unit.

9. The system as recited in claim 8 wherein said electronic control unit comprises receiving capabilities structured to interpret said performance information and further structured to generate at least one modified control signal to adjust said variable amount of distillate fuel provided to said engine.

10. The system as recited in claim 1 further comprising a dual output having a first line disposed in communicating relation with an original engine computing device and a second line disposed in communicating relation with said electronic control unit.

11. A method for retrofitting a refrigeration system for operation as a bi-fuel system, said method comprising:
    identifying a refrigeration system to retrofit having at least a thermostat, an engine, and a distillate fuel supply;

inserting a gaseous fuel supply and mixer in an air supply line upstream of an air cleaner and the engine;

structuring the gaseous fuel supply and mixer to deliver a predetermined amount of gaseous fuel to the engine;

disconnecting an original engine speed controller;

providing an actuator structured to isochronously control the amount of distillate fuel to the engine;

connecting the actuator in controlling relation to a distillate fuel intake of the engine;

providing an electronic control unit structured to generate at least one control signal to regulate at least the ratio of gaseous fuel and distillate fuel used by the engine;

connecting the electronic control unit in intercepting relation to the thermostat, the electronic control unit configured to intercept an output command signal sent by the thermostat;

the electronic control unit further disposed in in controlling relation to the actuator at least partially dependent upon the output command signal.

12. The method as recited in claim 11 further comprising positioning the mixer upstream of an air cleaner of the air supply line.

13. The method as recited in claim 11 further comprising disconnecting an original information output and inserting a dual output in place of the original information output.

14. The method as recited in claim 13 further comprising connecting a first line of the dual output to the original engine speed controller, and connecting a second line of the dual output to the electronic control unit.

15. The method as recited in claim 11 further comprising installing at least one sensor in monitoring relation to the refrigeration system to monitor performance information of the system.

16. The method as recited in claim 15 further comprising connecting the at least one sensor in transmitting communication with the electronic control unit.

* * * * *